United States Patent
Thomazios

(10) Patent No.: US 9,228,563 B2
(45) Date of Patent: Jan. 5, 2016

(54) WIND ENERGY RECOVERY IN THE WHEELS OF VEHICLES

(71) Applicant: Kevin Thomazios, Fremont, CA (US)

(72) Inventor: Kevin Thomazios, Fremont, CA (US)

( * ) Notice: Subject to any disclaimer, the term of this patent is extended or adjusted under 35 U.S.C. 154(b) by 0 days.

(21) Appl. No.: 14/724,705

(22) Filed: May 28, 2015

(65) Prior Publication Data

US 2015/0260154 A1   Sep. 17, 2015

Related U.S. Application Data

(63) Continuation-in-part of application No. 13/645,468, filed on Oct. 4, 2012.

(51) Int. Cl.
| | | |
|---|---|---|
| *B60K 16/00* | (2006.01) | |
| *F03D 1/02* | (2006.01) | |
| *F03D 9/00* | (2006.01) | |

(52) U.S. Cl.
CPC *F03D 1/025* (2013.01); *F03D 9/00* (2013.01); *F03D 9/002* (2013.01); *F05B 2220/602* (2013.01); *F05B 2240/941* (2013.01); *Y02E 10/72* (2013.01)

(58) Field of Classification Search
CPC ....... F03D 1/025; F03D 9/002; B60L 18/006; B60K 16/00; B60K 2016/006; Y02E 10/725
See application file for complete search history.

(56) References Cited

U.S. PATENT DOCUMENTS

| | | | | |
|---|---|---|---|---|
| 4,423,794 A * | 1/1984 | Beck | ............ | B60K 6/105 180/165 |
| 6,765,324 B1 | 7/2004 | Chien | | |
| 6,962,223 B2 * | 11/2005 | Berbari | ............ | B60K 6/105 180/165 |
| 7,135,786 B1 * | 11/2006 | Deets | ............ | B60K 16/00 290/44 |
| 7,552,787 B1 * | 6/2009 | Williams | ............ | B60K 6/105 180/65.51 |
| 7,624,830 B1 * | 12/2009 | Williams | ............ | B60K 6/105 180/165 |
| 7,679,210 B2 | 3/2010 | Zhu | | |
| 8,104,557 B2 * | 1/2012 | Takahashi | ............ | B60L 8/006 180/2.2 |
| 8,172,022 B2 | 5/2012 | Schneidewind | | |
| 8,430,192 B2 * | 4/2013 | Gillett | ............ | B60K 1/04 180/2.2 |
| 8,459,386 B2 * | 6/2013 | Pickholz | ............ | B60K 7/0007 180/65.31 |
| 8,579,054 B2 * | 11/2013 | Knickerbocker | ....... | B60L 8/006 180/165 |
| 8,627,914 B2 * | 1/2014 | Berbari | ............ | B60L 11/16 180/165 |
| 8,646,550 B2 * | 2/2014 | Penev | ............ | B60L 8/003 180/165 |
| 8,721,302 B2 * | 5/2014 | Chang | ............ | F03D 9/002 417/336 |
| 8,733,476 B2 * | 5/2014 | Cong | ............ | B60K 3/00 180/165 |
| 9,022,150 B2 * | 5/2015 | Cunico | ............ | B60L 8/006 180/2.1 |
| 9,067,500 B2 * | 6/2015 | Penev | ............ | B60L 7/28 |
| 2002/0172036 A1 * | 11/2002 | Chien | ............ | B60Q 1/326 362/192 |
| 2006/0093482 A1 * | 5/2006 | Wacinski | ............ | F03D 1/025 416/128 |
| 2006/0125243 A1 * | 6/2006 | Miller | ............ | F03D 1/025 290/55 |
| 2006/0163963 A1 * | 7/2006 | Flores | ............ | F03D 1/025 310/115 |

(Continued)

*Primary Examiner* — Brodie Follman

(57) ABSTRACT

One embodiment of an apparatus for wheel slipstream energy recovery in wheeled vehicles comprising a plurality of wheel spokes (21) of a wheel attached to a rotatable motoring shaft (22) which in turn is connected to a motor (26) and a generating propeller (23) attached to a rotatable generating shaft (24) which in turn is connected to a generator (25). Operation of the motor (26) results in the motoring propeller (21) to rotate and generate an accelerating slipstream towards the generating propeller (23) which results in the generator (25) rotating to convert recovered rotational energy into other forms of useable energy. The motor (26) may be an electric motor or an internal combustion engine. The generator (25) output is available for charging batteries or powering electrical loads in either electric or conventional vehicles. Both motor (26) and generator (25) are motoring and generating simultaneously.

3 Claims, 3 Drawing Sheets

(56) References Cited

U.S. PATENT DOCUMENTS

| | | | |
|---|---|---|---|
| 2009/0072541 A1* | 3/2009 | Van Harselaar | F03D 1/025 290/54 |
| 2010/0026009 A1* | 2/2010 | Sarwin | F03D 9/002 290/55 |
| 2011/0293419 A1* | 12/2011 | Koya | F03D 9/002 416/1 |
| 2013/0306389 A1* | 11/2013 | Penev | B60L 8/003 180/165 |
| 2014/0076641 A1* | 3/2014 | Penev | B60L 7/28 180/2.2 |
| 2014/0090366 A1* | 4/2014 | Akbar | F03D 9/002 60/398 |
| 2014/0225550 A1* | 8/2014 | Tchervenkov | H02K 21/22 318/473 |
| 2014/0267458 A1* | 9/2014 | Fisher | B60B 7/00 345/690 |
| 2015/0260154 A1* | 9/2015 | Thomazios | F03D 1/025 416/124 |

* cited by examiner

WIND ENERGY RECOVERY IN THE WHEELS OF VEHICLES

CROSS REFERENCE TO RELATED APPLICATION

This application is a CIP of Ser. No. 13/645,468, filed 2012 Oct. 4 by the present inventor, which is incorporated by reference.

BACKGROUND

Description of Prior Art

The following is a tabulation of prior art that presently appears most relevant:

| Patent Number | Issue Date | Patentee | Primary CPC, U.S. Class/Sub |
|---|---|---|---|
| U.S. Patents | | | |
| 6,765,324 B1 | 2004 Jul. 20 | Chien | H02K 7/02, 310/75 C |
| 7,552,787 B1 | 2009 Jun. 30 | Williams | B60K 1/00, 180/65.51 |
| 7,624,830 B1 | 2009 Dec. 1 | Williams | B60K 6/00, 180/165 |
| 7,679,210 B2 | 2010 Mar. 16 | Zhu | B60K 1/00, 290/55 |
| 8,172,022 B2 | 2012 May 8 | Schneidewind | B60K 6/10, 180/165 |
| 8,579,054 B2 | 2013 Nov. 12 | Knickerbocker | B60K 16/00, 180/2.2 |
| 8,646,550 B2 | 2014 Feb. 11 | Penev | B60K 16/00, 180/2.2 |
| 9,022,150 B2 | 2015 May 5 | Cunico | B60L 11/1809, 180/2.2 |
| U.S. Patent Application Publications | | | |
| Publication Nr. | | | |
| 2010/0026009 A1 | 2010 Feb. 4 | Sarwin | F03D 9/00, 290/55 |

Propellers or fans driven by a machine such as a motor, generate thrust by accelerating the air as it moves past the rotating blades, thus causing a pressure differential resulting in a net force. The flow of accelerating air past the blades is typically known as slipstream which has gained energy from the interaction with the rotating blades and continues to accelerate until its velocity peaks some distance behind the propeller. Slipstream is typically put to use as fast flowing air in commercial fans ranging from small domestic consumer fans to larger cooling fans found in industrial applications. Aside from this application, slipstream is considered a by-product of the thrust generation process and is largely ignored and unused. Instead, the primary application of rotating blades or spokes is to provide a propulsive force such as thrust in airplanes and ships or deliver torque through rotating hubs and spokes of wheels in ground-based vehicles. It then follows that this wasted slipstream energy could be recovered for the benefit of making additional energy available for prolonged operation and improved performance in wheeled electric and conventional vehicles.

The scope of the present patent includes an application for wind energy recovery in the wheels of vehicles, so a short clarification with respect to wheel energy recovery systems should be addressed. In U.S. Pat. No. 7,552,787 by Williams, issued 2009 Jun. 30, U.S. Pat. No. 7,624,830 by Williams, issued 2009 Dec. 1 and U.S. Pat. No. 8,172,022, by Schneidewind, issued 2012 May 8, energy recovery systems in wheels are covered. The aforementioned three patents make primary use of flywheels situated in or near wheels. Flywheels are used to store and release energy depending on whether the vehicle is accelerating or decelerating. However, dependency on acceleration and deceleration for energy is both unpredictable and inconsistent because a vehicle system cannot predict when the driver will be accelerating or braking. The duration of acceleration and braking, which determines how much energy is collected or released, is also highly variable for each acceleration or deceleration event. Thus, the amount of energy collected is inconsistent. Owners and drivers are unable to reliably predict how much energy their vehicles will have for their required range and payload combinations. Vehicle manufacturers using this approach for wheel energy recovery face a complex solution that does little to improve the range and payload issues currently facing state-of-the-art electric vehicles.

In U.S. Pat. No. 6,765,324 B1 by Chien, issued 2004 Jul. 20, it is one of the earliest implementations of wind energy recovery associated with wheels. An air impeller is mounted on the external face of the hub of a wheel and the impeller is engaged by the flow of slipstream as the wheel rotates. This configuration causes increased drag for the vehicle because the impeller and its housing directly opposes the vehicle slipstream, hence, the net benefit in overall energy recovery is marginal at best.

In U.S. Pat. No. 7,679,210 B2 by Zhu, issued 2010 Mar. 16, it is an enhancement of Chien's invention whereby the wind actuated component can be either rotating or still, depending on whether the rotor is attached directly to the wind actuated component when it is moving or whether the stator is attached to the wind actuated component acting as a wind vane held in place by the force of slipstream moving past the wheel. The cited reference does not teach to recover wind energy within the wheel. It suffers from the same fundamental problem as does Chien's invention—it causes even more significant drag on the vehicle which makes energy recovery performance marginal. Furthermore, the wind actuated component is required to be installed on the external hub of a vehicle's wheels which would expose the component to the curb during parking events and damage to the component becomes a high probability event.

In U.S. Pat. No. 8,579,054 B2 by Knickerbocker, issued 2013 Nov. 12, wind energy recovery is achieved through the use of large, rotating air scoops installed about the axles. The invention not only suffers significantly from the induced drag of the vehicle slipstream thereby negating the benefit of energy recovered but also requires wheel-to-wheel axles to be utilized when most modern vehicles utilize independent suspension which require wheel axles to be unconnected.

In U.S. Pat. No. 8,646,550 B2 by Penev, issued 2014 Feb. 11, wind energy recovery for an electric vehicle is achieved through a system of wheel fans and various ducts necessary to direct airflow from each wheel in order to reach a single generator situated in the rear of the vehicle. The extensive ducting requires significant volume within the vehicle effectively reducing useful space and payload. The single generator, with yet its own fan, leaves the vehicle vulnerable. Furthermore, Penev's method teaches the wheel fan required to induce airflow into the wheel is not part of the wheel but, in fact, a separate element. This necessitates an additional component that has to be mounted on each wheel axle or hub. Finally, the invention as described by Penev essentially requires wheel hub motors acting as generators to capture the energy of the wheel motion as driven by separate motors. However, Penev does not address the significant issue of counter-electromotive force or back-e.m.f.—as the wheel rotates, the rotor and stator in the wheel generator require energy to overcome the electromagnetic forces resisting rotation which can only come from the energy supplied by the motor. If the motor is not boosted or compensated for this energy, this clearly leads to the conclusion that the net rotation speeds of the wheel and its wheel fan would be lower than it would be without the wheel generator, thus leading to lower net energy recovery.

In U.S. Pat. No. 9,022,150 B2 by Cunico, issued 2015 May 5, wind energy is recovered through an elaborate system of windmills installed in wheel wells, in a foldable structure that is situated on top of the vehicle and even a large longitudinal fan spanning the approximate width of the vehicle. However, Cunico clearly states that the invention is for stationary purposes only; to recover ambient wind energy as and when it occurs including that generated by vehicles passing by. Such a system, because of the unpredictable nature of ambient wind, is unable to produce consistent and predictable energy recovery. The benefit of such an implementation against its cost is predictably low. The requirement that the wheel rims be of large diameter and the use of low profile tires places severe restrictions on the use of such a scheme in electric vehicles.

In U.S. Patent Application Publication 2010/0026009 A1 by Sarwin, published 2010 Feb. 4 and subsequently abandoned, the wind energy recovery apparatus at first glance bears strong similarities to the present invention. However, upon further detailed inspection of the reference specification, it is clearly evident that the specification is fundamentally flawed. Sarwin has failed to provide a structure whereby the fan generating the wind energy is separate and independent from the fan recovering the wind energy. The wheel described in the reference specification has its fan blades fixed to the wheel like spokes which would be appropriate for structural support of the wheel itself and would in fact generate wind when the wheel is in motion but there is no distinct specification for a generating fan or propeller or windmill to capture that wind energy. Instead, the wheel itself is described and depicted as being connected directly to a gear box before any rotational energy reaches the generator. The wheel is expected to both generate and capture wind energy simultaneously which is clearly impossible. Furthermore, no means for motoring the wheel has been provided while it is generating. The reader is left to wonder how such a scheme would lend itself to being driven or motored if the hub is already preoccupied with recovering wind energy.

SUMMARY

In accordance with one embodiment, an accelerating slipstream energy recovery apparatus for wheeled vehicles comprising a plurality of wheel spokes as part of a wheel and an independent propeller, connected to a pair of rotatable shafts which in turn are connected to a motor and a generator, respectively. The benefit of this configuration is that the wheel spokes generate accelerating slipstream energy for efficient recovery by the propeller in the form of rotational energy for conversion by the generator as desired.

Advantages

Accordingly, several advantages of one or more aspects are as follows: that permits simultaneous motoring and generating, that permits energy recovery in a compact configuration suitable for wheeled vehicles, that permits energy recovery with or without the use of gears or clutches, that permits energy recovery with concentric rotatable shafts, that permits energy recovery whether the pair of propellers are rotating in the same direction or opposite relative to each other, that permits more efficient energy recovery without the generating and motoring sections being connected or in contact with each other, that permits energy recovery in vehicles where the direction of motion is perpendicular to the axes of rotation of the propellers, that permits more predictable and consistent energy recovery in wheeled electric energy and internal combustion engine vehicles, that permits the elimination of alternators found in internal combustion engine vehicles and allowing for greater fuel efficiency. Other advantages of one or more aspects will be apparent from a consideration of the drawings and ensuing description.

DRAWINGS

Descriptions of Figures

REFERENCE NUMERALS

Figure 1A:
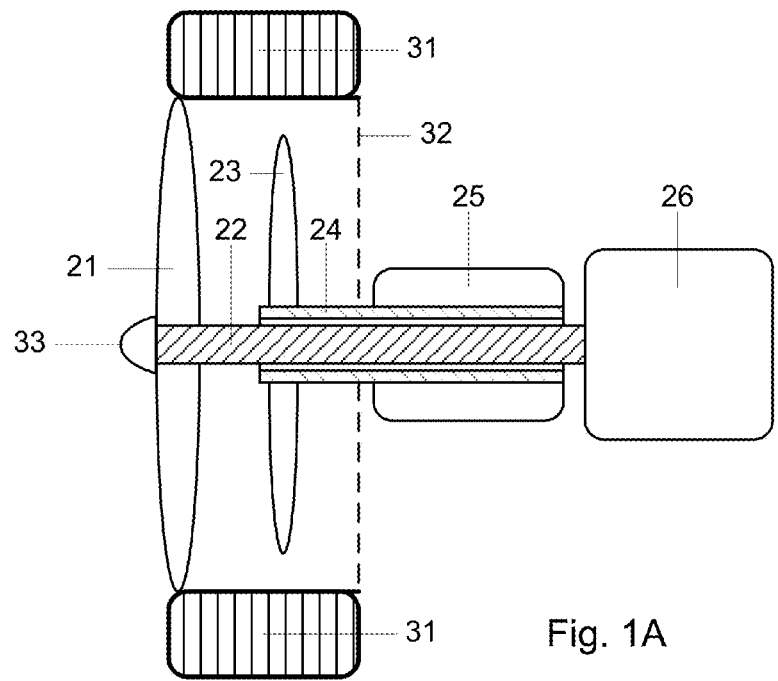
FIG. 1A shows an orthogonal view of the first embodiment in a wheel energy recovery application.

Each reference numeral listed below is unique and identifies the same element or component across all figures:

21 Motoring propeller or wheel spokes
22 Motoring shaft
23 Generating propeller
24 Generating shaft
25 Generator
26 Motor
27 Generating gear
28 Generating pinion
29 Motoring pinion
30 Motoring gear
31 Tire
32 Wheel rim
33 Wheel hub

DETAILED DESCRIPTION

For each embodiment, there is a unique sub-title and described in the following order of sub-sections: Configuration, Operation, Advantages.

First Embodiment

Figures 1B, 1C:
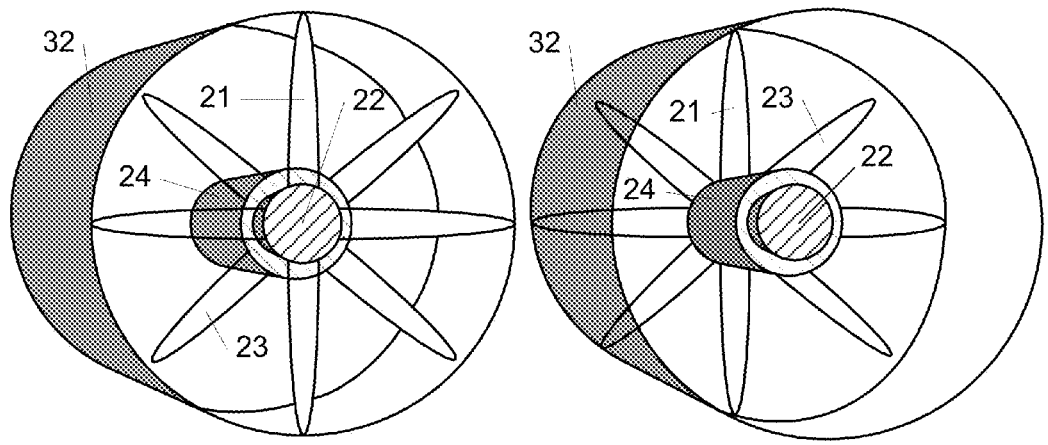
FIG. 1B shows the front perspective view of co-axial and concentric shafts with spokes within a wheel rim.
FIG. 1C shows the rear perspective view of co-axial and concentric shafts with spokes within a wheel rim.

Configuration—FIGS. 1A, 1B, 1C

The embodiment illustrated in FIG. 1A depicts one possible configuration for an apparatus generating an accelerating slipstream and then recovering energy from that slipstream. A motoring propeller 21 is attached to a rotatable motoring shaft 22 which in turn is connected to a motor 26. These elements comprise what will be referred to as the motoring section. A generating propeller 23 is attached to a rotatable generating shaft 24 which in turn is connected to a generator 25. These elements comprise what will be referred to as the generating section.

As depicted in FIG. 1A, there are no physical connections or contacts between the propellers. To ensure optimum performance, it is recommended that there should be no interference or obstruction in the flow of air from motoring propeller 21 to generating propeller 23.

Each propeller may have different numbers of blades and different diameters. The arithmetic ratio of the diameters of generating propeller 23 to motoring propeller 21 is known as the diameter ratio. There is no requirement for a specific diameter ratio between the propellers. However, it has been discovered by the author that the optimal diameter ratio is approximately between 0.725 and 0.775. A specific optimal ratio should be determined empirically for each embodiment. Regarding the number of blades, generally the more blades on motoring propeller 21, the greater the slipstream produced, benefitting the generating system. Similarly, the greater the number of blades on generating propeller 23, the higher the rotational speed thus, the greater the rotational energy production. FIG. 1A depicts each propeller having four blades which is the highest performing configuration investigated by the author. This is in no way the required number of blades or limiting the general functionality of the apparatus in any way.

Blade design can have a significant effect on performance. Blade design includes such factors as blade area, pitch, twist, airfoil, chord, thickness, hub area, and type of material. There are no requirements or specifications for these factors other than the choice of these factors should enable motoring propeller 21 to produce accelerating slipstream when commanded to rotate and generating propeller 23 should be able to be rotated by the accelerating slipstream. Most commercially available propellers at all scales will meet this requirement and persons skilled in the art should be reasonably familiar with these choices. It is also recommended that the material used to construct the propellers should be of a lightweight nature. This is ensures a mechanically low inertia for generating propeller 23 that will allow greater efficiency and performance. A lighter weight implementation of motoring propeller 23 would reduce the load on motor 26, allowing the motoring section of the system to rotate at higher speeds.

The two rotatable shafts 22 and 24 are depicted in FIG. 1A as concentric and sharing a common axis of rotation. Motoring shaft 22 rotates within generating shaft 24 with motoring shaft 22 extending beyond the end of generator 25 and into motor 26. There is no physical connection or contact between the two shafts which requires generating shaft 24 to be sufficiently and consistently hollow along its length to allow motoring shaft 22 to be aligned with the same axis of rotation while delivering rotational energy to motoring propeller 21. In this embodiment, the requirement for generating shaft 24 be sufficiently and consistently hollow not only benefits motoring shaft 22 but also ensures generating shaft 24 is freely rotatable to deliver as much recovered rotational energy as possible from generating propeller 23 to generator 25 without mechanical interference from the motoring section. There is no requirement for motoring shaft 22 to be hollow in this embodiment. FIGS. 1B and 1C are front and back perspective views to aid the reader in the understanding of the co-axial and concentric rotatable shafts.

Motor 26 produces rotational energy. This rotational energy, derived from an energy source conversion such as an electric charge via battery or fossil fuels, is delivered to motoring propeller 21 via the rotatable motoring shaft 22. Motor 26 may be an electric motor of any kind or an internal combustion engine. Generator 25 recovers the rotational energy produced by generating propeller 23, and via its associated generating shaft 24, converts that energy into a useable form such as direct current electricity. Generator 25 may be a direct or alternating current electric generator of any kind or a mechanical device that utilizes the recovered rotational energy.

FIG. 1A depicts both generator 25 and motor 26 as being directly mounted around generating shaft 24 and motoring shaft 22, respectively. For the motoring section, this is accomplished by having the external motor shaft, which is itself part of the motor's rotor, joined or coupled to motoring shaft 22 or having a motor with a sufficiently long shaft built in with the motor thereby integrating motoring shaft 22 with motor 26. For the generating section, generating shaft 24 can be accomplished similarly with the additional requirement that the shaft be hollow to allow for motoring shaft 22 as previously described. The direct mounting of motor 26 and generator 25 around their respective shafts is generally not a requirement for the apparatus to function but enables an embodiment both physically compact and efficient. As will be shown, alternative embodiments will allow either the motor or generator, or both, to be situated away from the shafts using other techniques such as gearing.

It may be appropriate to provide support bearings (not shown) to the shafts, particularly in instances where the shafts are long or where the shaft materials lack the appropriate stiffness, for example, when the weight of the propeller at the end of the shaft causes the shaft to bend or flex during rotation. Such bearings should be of the lowest possible resistance and persons skilled in the art are advised to choose such bearings with care, particularly where generating shaft 24 is concerned. It is recommended that support bearings, if needed, should be situated as close to the propellers as possible, for example, support for motoring shaft 22 between motoring propeller 21 and generating propeller 23. Another example is support for generating shaft 24 between generating propeller 23 and the generator 25. Persons skilled in the art should be knowledgeable about overall installation of support bearings with respect to their own specific embodiment. Furthermore, it is recommended to persons skilled in the art that each propeller should be secured to its axial position on its respective shaft using a collar (not shown) to prevent the propeller from sliding along the shaft axially due to continuous or even momentary high thrust conditions. It should also be made clear that generator 25 and motor 26 in FIG. 1A are securely fixed to a base or installation (not shown) of some kind, depending on the application.

The embodiment of FIG. 1A illustrates a wheel energy recovery application whereby the spokes radiating from a wheel hub 33 to a wheel rim 32 are the functional equivalent of the blades of motoring propeller 21. As the vehicle moves, the wheel rotates generating slipstream through the spokes and into the wheel rim cavity itself, hence, the slipstream impacts the blades of generating propeller 23, causing the rotation of generating shaft 24 connected to generator 25. It is highly recommended that the spokes are aerodynamically shaped as much as possible without compromising their ability to provide structural support to the wheel rim. Persons skilled in the art should be able to accomplish the design of wheel spokes that are functionally equivalent to that of the blades of a propeller. The spokes perform their primary function of providing structural integrity to the wheel as well as the additional task of acting as the motoring propeller 21.

There is no need for a dedicated motoring propeller to generate the slipstream, Thus, an economical, efficient and elegant solution is presented.

First Embodiment

Operation—FIGS. 1A, 1B, 1C

When motor 26 is commanded to operate, it produces rotational energy that causes motoring shaft 22 to rotate. Motoring shaft 22 delivers the rotational energy to motoring propeller or wheel spokes 21, causing it to rotate. It is a well established fact that rotating propellers produce a slipstream or the movement of air past the blades. Slipstream consists of axial and tangential components where the axial component is parallel to the axis of rotation while the tangential component is perpendicular to the axis of rotation. Typically, the axial component is by far the more dominant component. The speed of slipstream is dependent on several factors such as propeller rotation speed, the speed of undisturbed air before reaching the blades, and the previously mentioned blade design factors. Slipstream flowing from the back of the motoring propeller or wheel spokes 21 pass through and around the blades of generating propeller 23. The force of slipstream impacting the blades on generating propeller 23 gives rise to rotation of generating propeller 23. This is the fundamental act of recovering the energy in the slipstream. Generating propeller 23 converts the slipstream energy into rotational energy which then causes generating shaft 24 to rotate. Generating shaft 24 delivers rotational energy to generator 25 which then converts the rotational energy into a form of energy to be utilized as desired. For example, an electrical generator converting the rotational energy into electrical energy which is then used to charge batteries or power other electrical equipment as needed.

Operation of the motoring section is in no way dependent on the generating section. However, operation of the generating section is dependent on the motoring section for the required slipstream. As mentioned earlier, there are no physical connections or contacts between the motoring and generating sections. This is to ensure that the generating section is recovering mostly what would otherwise be wasted energy. Energy used in powering the motoring section, specifically motor 26, is not used in the recovery of slipstream energy.

The degree of slipstream energy recovered is a direct function of the speed of slipstream at generating propeller 23. The faster the slipstream speed, the faster generating propeller 23 rotates, the more energy is recovered and converted to rotational energy. Consequently, when generating shaft 24 rotates faster, generator 25 converts more rotational energy into, for example, electrical energy. Conversely, the slower the slipstream, the slower the rotation of generating propeller 23, the less energy is recovered and converted to rotational energy resulting in less energy being converted by generator 25.

The direction of rotation of generating propeller 23 with respect to motoring propeller 21 has a significant effect on performance. There is no requirement as to the direction of rotation for motoring propeller 21 in any embodiment of the proposed apparatus; either clockwise or counter-clockwise is satisfactory. The same can be said of generating propeller 23. However, relative to one another, whether rotating in the same direction, hereinafter referred to as co-rotation, or opposite to each other, hereinafter referred to as counter-rotation, there is a significant difference in performance that requires careful consideration by persons skilled in the art. The author has discovered that co-rotation consistently outperforms counter-rotation by a significant margin in maximizing slipstream energy recovery. Co-rotation enables higher rotation speeds for generating propeller 23 without affecting the rotation speed of motoring propeller 21 and does in fact reduce the thrust experienced by motoring propeller 21 due to the opposing thrust experienced by generating propeller 23. The issue of net thrust can be effectively solved in vehicles where the direction of motion is perpendicular to the axis of rotation, such as automobiles. The wheel arrangement in automobiles is symmetrical such that the net thrust experienced by the wheel on the left side is cancelled out by the wheel on the right side.

The installed distance or separation between propeller hubs is a lesser factor affecting performance when compared to propeller speeds, diameter ratio, number of blades, and blade design. It is well understood from the Rankine-Froude momentum theory, developed in the second half of the 19th century, that the speed of slipstream generated by the motoring propeller 21 continues to accelerate such that its speed continues to increase for some distance behind the propeller until it peaks. Ideally, any attempt at recovering the energy in the slipstream occurs at the point of maximum speed of the slipstream. The location of the point of maximum slipstream speed along the axis of rotation in the embodiment of FIG. 1A is accomplished by empirical testing. Provisions should be made by persons skilled in the art to allow either motoring propeller 21 or generating propeller 23 to be adjusted along the axis of rotation until the desired performance is achieved. It should be pointed out that depending on the application, placement at the optimal location for generating propeller 23 may not be possible due to application constraints such as space or volume available. In such cases, it is recommended to persons skilled in the art that they determine the maximum allowable separation between the propellers, given the constraints of their specific embodiment, and then empirically determine the best performance achievable within that distance.

In a wheeled vehicle application, motor 26 may be in the form of an electric motor, as used in all-electric or hybrid vehicles, or even an internal combustion engine. The output from generator 25 can be used to charge the vehicle's batteries, power the electrical accessories in the vehicle or even replace the alternator found in internal combustion vehicles. Due to the enclosure of the wheel rim, there may be minor performance improvements as a result of lower losses of slipstream energy.

First Embodiment

Advantages—FIGS. 1A, 1B, 1C

From the descriptions of configuration and operation, the following general advantages of the first embodiment are evident:

(a) The absence of gears, also known as direct drive, reduces mechanical losses typically associated with gears.

(b) The load on motor 26 is reduced without gearing, allowing motor 26 to output more rotational energy per given unit of input energy thereby increasing efficiency of the motoring section. Increased efficiency of the motoring section improves the production of slipstream, resulting in the improved efficiency of slipstream energy recovery.

(c) The absence of gears reduces the overall inertia of the generating section, thereby improving the efficiency of the generating section.

(d) The use of concentric rotatable shafts reduces the lengths and weights of the shafts, as compared to non-concentric shafts, thus enabling a more compact embodiment and a more attractive commercial implementation.

(e) The use of concentric rotatable shafts results in weight savings contributing to lower overall inertia in the generating section, thus leading to improved generator 25 output.

(f) The weight savings from reduced shaft lengths and the use of direct drive reduces manufacturing costs.

(g) The simplicity of the embodiment of FIG. 1A contributes to reliability and robustness as well compactness.

(h) The ability to recover slipstream energy regardless of whether the propellers are co-rotating or counter-rotating.

In addition, the application-specific advantages of this first embodiment with respect to its intended wheel application are as follows:

(i) As the wheel rotates, it not only consumes energy enabling its rotation but also recovers energy in the slipstream caused by the rotating spokes of the wheel rim. This is the key advantage of simultaneous motoring and generating over state-of-the-art technology.

(j) As long as the vehicle that the wheel is attached to is moving, energy will be recovered. For the most part, state-of-the-art vehicles consume the energy they carry in storage at the beginning of each journey. State-of-the-art electric and hybrid vehicles are capable of recovering energy only when brakes are applied which is a method known as regenerative braking. Regenerative braking is unpredictable and inconsistent. It is difficult to ascertain in advance when one will be braking and for how long. This makes the process of energy recovery marginally useful and much less dependable. The recovery of energy with the embodiment of FIG. 1A is significantly more predictable and consistent because it recovers energy while the vehicle is in motion and is not dependent on unpredictable events such as braking.

(k) The faster the wheel rotation, the greater the slipstream produced, the greater the energy recovered by the generating section. This is a basic feature of the apparatus discussed previously but is repeated here since it relates to vehicle speed. The faster the vehicle moves, the greater its energy consumption, but also, the greater its energy recovery. The benefit of this feature allows for a greater increase in cruising and maximum speeds of electric vehicles over longer sustained periods.

(l) The range of electric vehicles is improved with the application of this apparatus using the embodiment of FIG. 1A because they would no longer be strictly limited by the charge capacity of on-board batteries. The output of generator 25 can be used to charge batteries while in motion or power accessories that would otherwise drain the batteries thereby reducing the discharge rate of batteries and extending the range of the vehicle.

(m) The payload, or useful carrying capacity, of electric vehicles is also improved with the application of this apparatus using the embodiment of FIG. 1A because it reduces the need for as many batteries to be on-board as the state-of-the-art currently requires.

(n) Battery charging times and the number of charging cycles required is also reduced because of the mostly continuous charging taking place while the vehicle is in motion.

(o) The use of the proposed apparatus and its embodiment of FIG. 1A suggest an alternative application for internal combustion engine vehicles. Currently, the alternator is a major electromechanical accessory currently required to be driven by an auxiliary or serpentine drive belt connected to the internal combustion engine. The alternator represents significant drag on the engine and affects overall fuel efficiency. The embodiment of FIG. 1A would eliminate the need for an alternator thereby improving the fuel efficiency of internal combustion vehicles.

Alternative Embodiment 2

Figure 2:
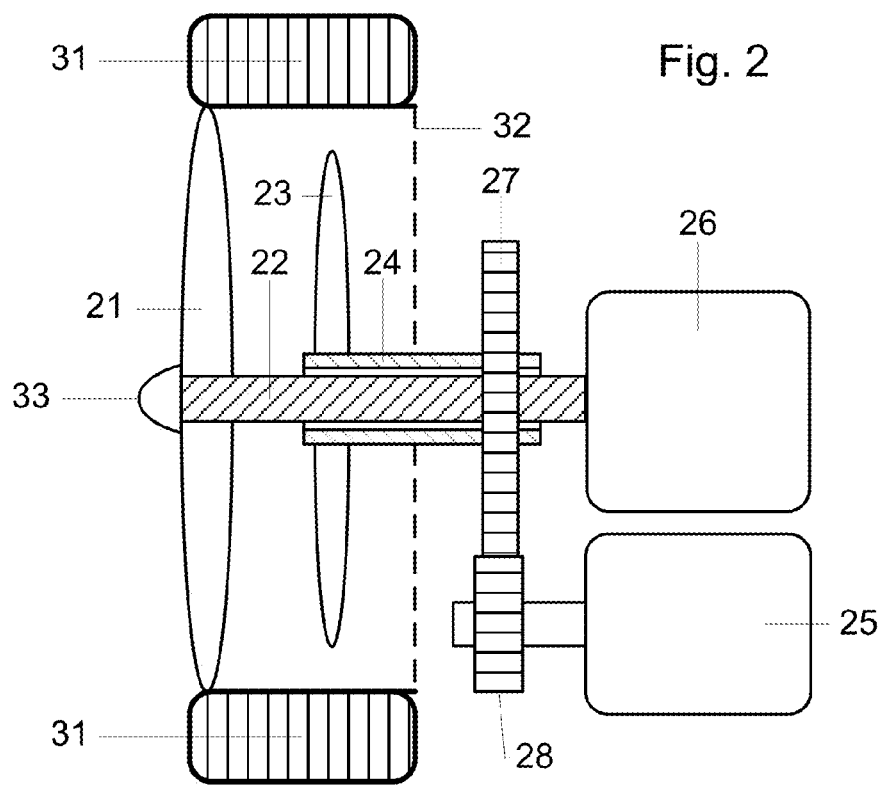
FIG. 2 shows alternative embodiment 2 with a generator geared to its shaft.

Configuration—FIG. 2

The embodiment of FIG. 2 illustrates an alternative to FIG. 1A by the possible use of gearing with generator 25. A generating gear 27 is mounted towards the rear of generating shaft 24. Generating gear 27 is engaged with a generating pinion 28 which could be a small gear in itself or a shaft or spindle cut with teeth as part of generator 25.

Alternative Embodiment 2

Operation—FIG. 2

Operation of the embodiment of FIG. 2 is similar to the operation described for the embodiment of FIG. 1A with the exception of the gear actions. When generator shaft 24 is rotated by generating propeller 23, generating gear 27 rotates and through the direct engagement of its gear teeth, generating pinion 28 consequently rotates. Generating pinion 28 then rotates generator 25, thereby completing the transfer of recovered slipstream energy from generating propeller 23 to generator 25.

Alternative Embodiment 2

Advantages—FIG. 2

The advantage of this embodiment over the first embodiment is the flexibility in the configuration enabled by the of use gears thereby allowing for generator 25 to be situated unaligned from generating shaft 24. Generator 25 can now be more easily disassembled and even removed entirely for maintenance and repair. Additionally, for the purposes of product development, those skilled in the art will be able to more conveniently experiment with different generators by simply removing generator 25 and its generating pinion 28. Commercial-off-the-shelf generators can be used instead of custom made generators that would have to fit the specific diameter of generating shaft 24, as in the case of the embodiment of FIG. 1A.

Alternative Embodiment 3

Figure 3:
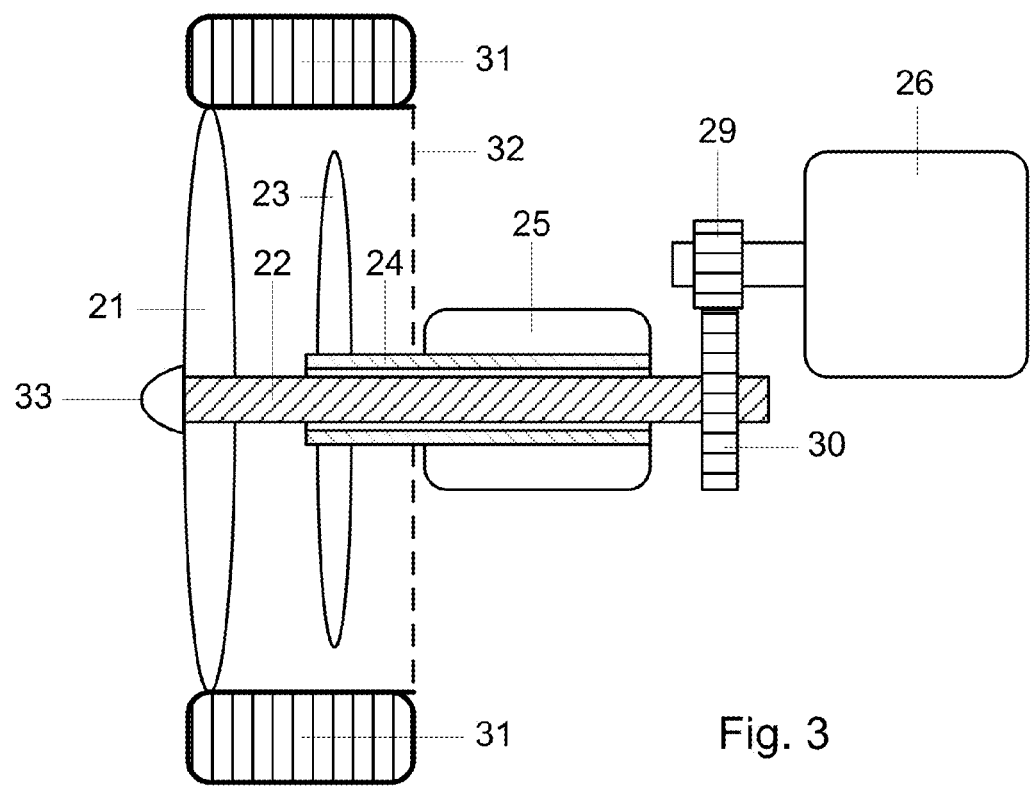
FIG. 3 shows alternative embodiment 3 with a motor geared to its shaft.

Configuration—FIG. 3

The embodiment of FIG. 3 illustrates an alternative to FIG. 1A by the possible use of gearing with motor 26. A motoring gear 30 is mounted towards the rear of motoring shaft 22. Motoring gear 30 is engaged with a motoring pinion 29 which could be a small gear in itself or a shaft or spindle cut with teeth as part of motor 26.

Alternative Embodiment 3

Operation—FIG. 3

Operation of the embodiment of FIG. 3 is similar to the operation described for the embodiment of FIG. 1A with the exception of the gear actions. When motor 26 is commanded to rotate, motoring pinion 29 rotates and through the direct engagement of its gear teeth, motoring gear 30 consequently rotates. Motoring gear 30 then rotates motoring shaft 22, thereby causing motoring propeller 21 to rotate and produce slipstream.

Alternative Embodiment 3

Advantages—FIG. 3

The advantage of this embodiment over the first embodiment is the flexibility in the configuration enabled by the use of gears thereby allowing for motor 26 to be situated unaligned from motoring shaft 22. Motor 26 can now be more easily disassembled and even removed entirely for maintenance and repair. Additionally, for the purposes of product development, those skilled in the art will be able to more conveniently experiment with different motors by simply removing motor 26 and its motoring pinion 29. Commercial-off-the-shelf motors can be used instead of custom made motors that would have to fit the specific diameter of motoring shaft 22, as in the case of the first embodiment of FIG. 1A.

Alternative Embodiment 4

Figure 4:
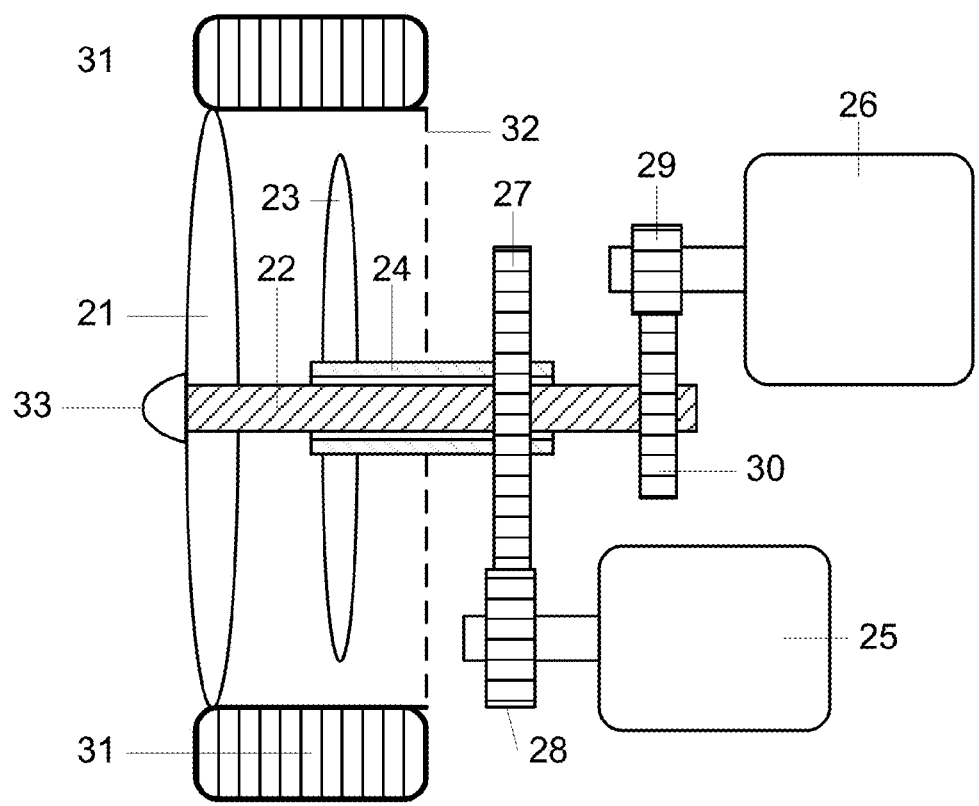
FIG. 4 shows alternative embodiment 4 with a motor and a generator geared to their respective shafts.

Configuration—FIG. 4

The embodiment of FIG. 4 illustrates an alternative to FIG. 1A by having both motor 26 and generator 25 geared as previously described individually in alternative embodiments 2 and 3.

Alternative Embodiment 4

Operation—FIG. 4

Operation of the embodiment of FIG. 4 is similar to the operation described for the embodiment of FIG. 1A with the additional descriptions of operations for alternative embodiments 2 and 3.

Alternative Embodiment 4

Advantages—FIG. 4

The advantage of this embodiment over the first embodiment is the flexibility in the configuration enabled by the of use gears thereby allowing for motor 26 and generator 25 to be situated unaligned from both motoring and generating shafts 22, 24, respectively. The advantages of alternative embodiments 2 and 3 are fully applicable in this embodiment.

CONCLUSION, RAMIFICATIONS, AND SCOPE

Accordingly, the reader will see that in at least one embodiment, I have provided an apparatus for wind energy recovery of accelerating slipstream in wheeled vehicles generated by rotating bodies, such as propeller blades and spokes of wheel rims, which have the following advantages:
  permits simultaneous motoring and generating;
  permits energy recovery in an efficient and economical configuration;
  permits energy recovery with or without the use of gears;
  permits energy recovery with common axes of rotation for motoring and generating propellers;
  permits energy recovery whether the pair of propellers are co-rotating or counter-rotating;
  permits energy recovery without the generating and motoring sections being connected or in contact with each other;
  permits energy recovery in vehicles where the direction of motion is perpendicular to the axis of rotation of the propellers;
  permits more predictable and consistent energy recovery in electric energy vehicles thereby improving their range, payload, sustained speeds, and battery charging times;
  permits the elimination of the alternator found in internal combustion engine vehicles and allowing for greater fuel efficiency.

While the above description contains many specificities, these should not be construed as limitations on the scope of any embodiments, but as exemplifications of various embodiments thereof. Many other ramifications and variations are possible within the teachings of the various embodiments.

Thus, the scope should be determined by the appended claims and their legal equivalents, and not by the examples given.

I claim:

1. An apparatus for wind energy recovery in the wheels of vehicles, comprising:
   a. a wheel,
   b. a plurality of aerodynamically-shaped wheel spokes,
   c. a motoring shaft,
   d. a motor,
   e. a generating propeller,
   f. a generating shaft,
   g. a generator, and
   h. said wheel spokes are fixed between the rim and hub of said wheel connected to said motor via said motoring shaft which is concentric, co-axial and free to rotate independently within said generating shaft which connects said generating propeller to said generator enabling simultaneous motoring and generating within said wheel, and
   i. said motor, generator, motoring shaft, generating shaft and generating propeller are all located downwind of said wheel spokes and out of the vehicle slipstream thus causing no drag penalty,
   whereby the apparatus enables energy recovery from wind passing through said wheel spokes while simultaneously allowing for motoring of the same wheel without any energy penalty to said motor or drag penalty to the vehicle thereby extending the available electrical energy on-board for either electric or conventional internal combustion vehicles.

2. The wind energy recovery apparatus of claim 1 wherein said generating shaft is connected to said generator and said generating propeller via a plurality of gears.

3. The wind energy recovery apparatus of claim 1 wherein said motoring shaft is connected to said motor and said motoring propeller via a plurality of gears.

* * * * *